United States Patent
Dunleavy et al.

(10) Patent No.: US 9,040,928 B2
(45) Date of Patent: *May 26, 2015

(54) DETECTION OF IONISING RADIATION

(75) Inventors: Michael Dunleavy, Filton (GB); Sajad Haq, Manswood (GB); Douglas Beverley Stevenson King, Preston (GB); Nicholas Robert Giacomo Colosimo, Preston (GB); Jonathan Alexander Silvie, Ulverton (GB); Philip Lawrence Webberley, Preston (GB)

(73) Assignee: BAE SYSTEMS plc (GB)

( * ) Notice: Subject to any disclaimer, the term of this patent is extended or adjusted under 35 U.S.C. 154(b) by 49 days.

This patent is subject to a terminal disclaimer.

(21) Appl. No.: 13/298,025

(22) Filed: Nov. 16, 2011

(65) Prior Publication Data

US 2012/0061575 A1 Mar. 15, 2012

Related U.S. Application Data

(62) Division of application No. 11/990,453, filed as application No. PCT/GB2007/050780 on Dec. 21, 2007, now abandoned.

(30) Foreign Application Priority Data

Dec. 29, 2006 (GB) .................................. 0626055.8

(51) Int. Cl.
*G01T 1/20* (2006.01)
*G01T 1/204* (2006.01)
*G01T 5/08* (2006.01)

(52) U.S. Cl.
CPC . *G01T 5/08* (2013.01); *G01T 1/201* (2013.01); *G01T 1/204* (2013.01)

(58) Field of Classification Search
CPC ............... G02B 2207/113; G02B 2006/12104; G01T 1/201; G01T 1/20; G01T 1/2002; G01T 1/2006; G01T 1/2018; G01T 1/204; G01T 5/08; G01N 2201/08; G01N 2201/0833; G01N 21/64; G01J 1/0425; G01J 3/0218
USPC .................................. 250/361 R, 363.01, 368
See application file for complete search history.

(56) References Cited

U.S. PATENT DOCUMENTS 4,788,436 A    11/1988  Koechner
5,308,986 A *   5/1994  Walker ..................... 250/370.11
(Continued)

FOREIGN PATENT DOCUMENTS

EP    0 606 732 A1    7/1994
EP    1 058 127 B1    6/2000
(Continued)

OTHER PUBLICATIONS

Fleishman et al., "A New Scintillation Gel for Measuring the Activity of Suspensions," Dec. 1960, The Soviet Journal of Atomic Energy, vol. 6, Issue 6, p. 502.*
(Continued)

*Primary Examiner* — David Porta
*Assistant Examiner* — Carolyn Igyarto
(74) *Attorney, Agent, or Firm* — Finch & Maloney PLLC

(57) ABSTRACT

A detector for detecting ionizing radiation comprises a scintillator 10 selected to emit light in response to incidence thereon of radiation to be detected, at least one detector 16 for detecting said emitted light, and at least one optical waveguide 12 for transmitting said emitted light to said detector 16. The optical waveguide typically comprises a flexible solid or hollow fiber that can be incorporated into a flexible mat or into a fiber-reinforced structure, so that the detector is integrated therewith.

11 Claims, 9 Drawing Sheets

(56) References Cited

U.S. PATENT DOCUMENTS

| | | | |
|---|---|---|---|
| 5,391,878 A | 2/1995 | Petroff | |
| 5,434,415 A | 7/1995 | Terada et al. | |
| 5,783,829 A * | 7/1998 | Sealock et al. | 250/367 |
| 6,310,352 B1 | 10/2001 | Gross et al. | |
| 6,847,700 B1 * | 1/2005 | Mitra et al. | 378/145 |
| 6,883,921 B2 | 4/2005 | Mimura et al. | |
| 6,989,541 B2 * | 1/2006 | Penn | 250/390.01 |
| 7,375,341 B1 * | 5/2008 | Nagarkar et al. | 250/370.11 |
| 2004/0095652 A1 * | 5/2004 | Kitabayashi et al. | 359/636 |
| 2005/0236577 A1 | 10/2005 | Katagiri | |
| 2007/0278413 A1 | 12/2007 | Katagiri et al. | |
| 2008/0128631 A1 * | 6/2008 | Suhami | 250/370.09 |

FOREIGN PATENT DOCUMENTS

| | | |
|---|---|---|
| GB | 2056671 A | 3/1981 |
| GB | 2149193 A | 6/1985 |
| JP | 57-076466 A | 5/1982 |
| JP | 57076466 A | 5/1982 |
| JP | 60-159675 A | 8/1985 |
| WO | WO 00/04403 A1 | 1/2000 |

OTHER PUBLICATIONS

United Kingdom Search Report.

Notification Concerning Transmittal of International Preliminary Report on Patentability and the Written Opinion of the International Searching Authority in corresponds Application No. PCT/GB2007/050780 (Forms PCT/IB/326, PCT/IB/373 and PCT/ISA/237) dated Jul. 9, 2009.

Great Britain Search Report dated Jun. 7, 2007 in corresponding GB Application No. 0626055.8, 2 pps.

* cited by examiner

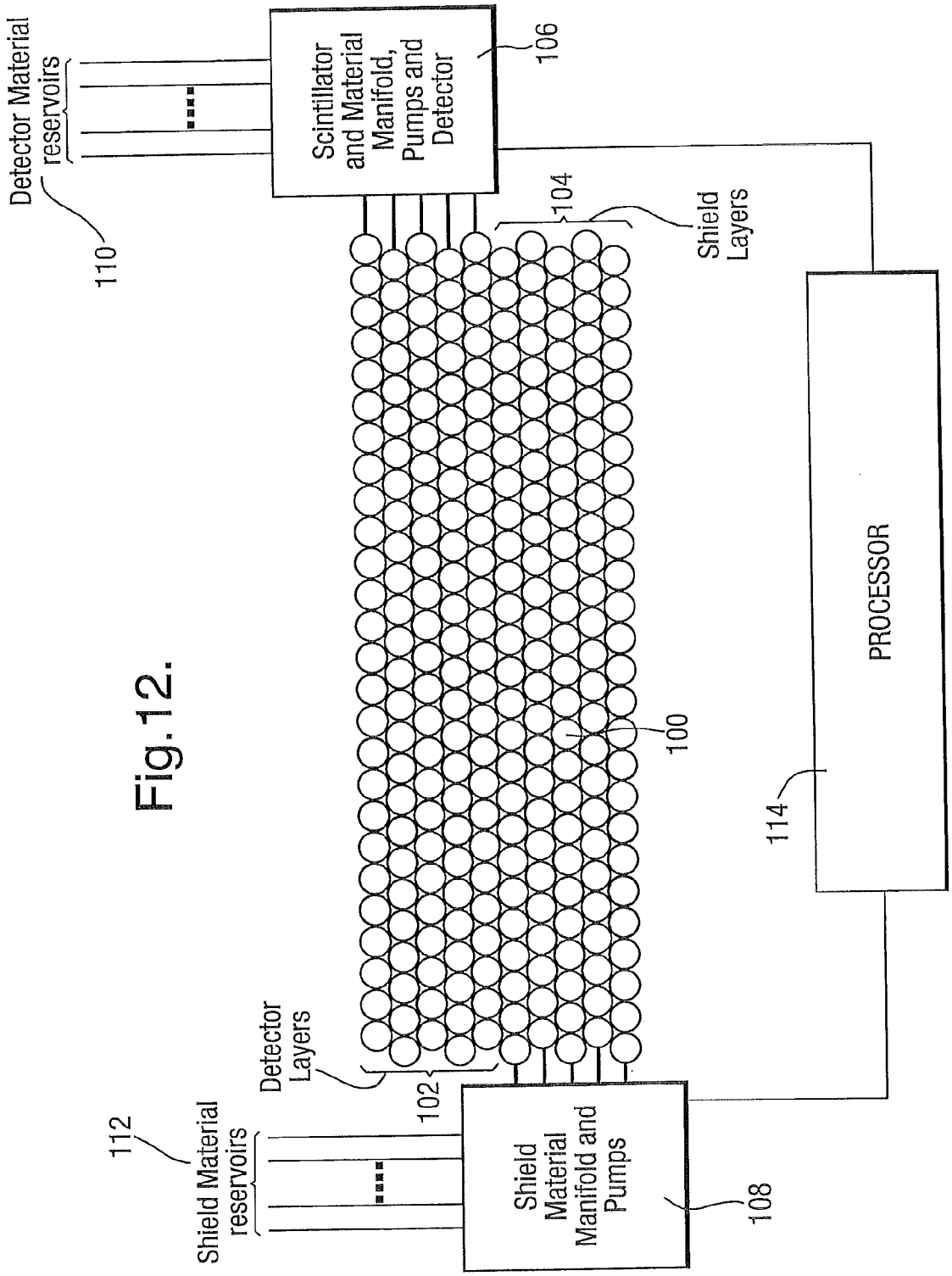

DETECTION OF IONISING RADIATION

RELATED APPLICATION

This application is a divisional of U.S. application Ser. No. 11/990,453 filed on Feb. 14, 2008, which is a national stage of PCT/GB2007/050780 filed on Dec. 21, 2007 that claims priority to GB Application No. 0626055.8 filed on Dec. 29, 2006, the content of each above-cited application is hereby incorporated by reference in its entirety.

FIELD

This invention relates to apparatus and methods for the detection of ionising radiation.

BACKGROUND

The term "ionising radiation" is used in the conventional sense to mean alpha particles, beta particles, x-rays, gamma radiation, neutrons and protons. There are many instances where it is required to detect ionising radiation. For example medical or scientific staff and those working in other facilities where radioactive material is used carry personal dosimeters to monitor the amount of radiation to which they have been exposed. It is also important routinely to monitor such facilities against inadvertent leakage of radiation. Conventionally, detectors such as Geiger tubes, liquid scintillators with an attached photo multiplier or photodiode, and solid state detectors are used. Although such devices exist, they tend to be separate instruments that are not readily incorporated into structures or fabrics. In addition, the static devices are not readily capable of detecting more than just the presence and magnitude of the radiation signal. They do not accurately locate the source of the signal and this has to be done separately by a portable device.

SUMMARY

We have designed a detection apparatus and method that can be used on its own or incorporated into a structure or fabric and which can be designed to allow the source of the radiation to be detected.

Accordingly, in one aspect, this invention provides a detector for detecting ionising radiation, said detector comprising:— a scintillator selected to emit light in response to incidence thereon of radiation to be detected;

at least one detector for detecting said emitted light, and at least one optical waveguide for transmitting said emitted light to said detector.

In this arrangement there may a single scintillator associated with each waveguide or there may be several scintillators spaced along the length of the waveguide to provide an extended detection region.

There are several different possible configurations of scintillator and waveguide; in one arrangement said waveguide is an optical fibre and said scintillator is a solid scintillator element through which said optical fibre passes, whereby light emissions in said scintillator element are transmitted to said detector by said fibre. Preferably the refractive index of the scintillator element is less than that of the optical fibre.

Conveniently at least part of the external surfaces of the scintillator element and the optical fibre are provided with a coating of reflective material. The reflective material may be selected from gold, silver, platinum, indium and aluminium.

In order to increase the light signal there may be a plurality of optical fibres passing through said scintillator element and in optical contact therewith, and means for detecting said light emissions. Likewise said optical fibres may be disposed orthogonally in rows and columns, or orthogonally in three dimensions (x,y,z). Where the fibres are disposed in rows and columns, successive planes of rows and columns may be stacked.

The optical fibre may follow a helical or serpentine path through said scintillator element. The optical fibre may be provided as a woven fabric element. The scintillator element may be of spherical shape, with said optical fibre wrapped into a ball configuration.

In another arrangement said at least one waveguide comprises a hollow fibre containing a scintillator material. The scintillator material may comprise a liquid, gel or solid. Where it is a liquid or gel, the detector may include means for selectively introducing and withdrawing said scintillator material from said hollow fibre. In this way the scintillator material may be removed or replaced with another material where different radiation is to be detected, or where the fibres are to be filled with a liquid or gel shielding material. With a hollow fibre or tubular arrangement light emissions can be transmitted to the detector in different ways. In one scheme, the light emissions may be transmitted to said detector down the central space of the tube by total internal reflection off the inner walls of said fibre. To assist this at least part of the inner surface of the fibre may be provided with a coating of reflective material.

Alternatively, the light emissions may be transmitted to said detector through the fibre wall by total internal reflection within the fibre wall, and to assist this at least part of the external surface of the fibre may be provided with a coating of reflective material (See FIG. 6c). In both cases suitable reflective materials include gold, silver, platinum, indium and aluminium.

The fibres may be arranged in a wide variety of layouts and shapes as described above.

In order to determine the location of the incidence of radiation on the scintillator, the detector may include means for detecting light emissions at opposite ends of said waveguide and means responsive to the timings of the light emissions to determine the location of the incident radiation along the length of the waveguide. Where the fibres are arranged in two or three dimensions this allows the incidence to be detected in two or three dimensions.

Where for example the detector is designed to detect neutrons, the detector may include a moderator material to moderate or slow the radiation incident on said scintillator material. The moderator material may be contained in a hollow fibre adjacent the scintillator material.

The scintillator material may be responsive to at least one of alpha particles, beta particles (electrons), x-ray radiation, gamma radiation, neutrons, protons. The selection and use of suitable scintillator materials is well known to those skilled in the art.

To allow radiation of different types to be detected, the detector may include a plurality of respective scintillators or groups thereof and a plurality of associated waveguides, with each scintillator or group thereof being responsive to a selected radiation. Thus the scintillators or groups thereof may be arranged in layers, with each layer being responsive to a predetermined radiation.

To allow the condition of the fibre to be monitored or diagnosed, the detector may include means for injecting light into the optical waveguide, and means for detecting and processing of the detected light signal to determine a condition of the optical fibre.

Advantageously the detector may allow optical data to be transmitted along the waveguide at a non-conflicting wavelength. Likewise heating or coolant medium may be passed down adjacent hollow fibres.

In another aspect, this invention provides a fibre composite structure including a matrix material, a plurality of structural fibres, and at least one optical waveguide embedded therein, with a scintillator in optical contact with said waveguide and selected to emit light in response to ionising radiation, and a detector for detecting light emissions transmitted from said scintillator by said waveguide.

Preferably the structure includes a plurality of scintillators and a plurality of optical waveguides embedded in said matrix.

In another aspect, this invention provides a flexible textile material comprising textile fibres and incorporating therein at least one optical waveguide, with a scintillator in optical contact with said waveguide and selected to emit light in response to ionising radiation, and a detector for detecting light emissions transmitted by said waveguide.

In another aspect, this invention provides a method of detecting and locating of the incidence of radiation along an elongate path or structure which comprises providing at least one elongate optical waveguide having disposed therealong at least one scintillator element, and a detector for detecting light emissions transmitted by said waveguide from said scintillator element or elements.

In another aspect, this invention provides a method of detecting and locating emission of radiation from a space which comprises surrounding at least part of said space with a plurality of fibres each having scintillator elements associated therewith and detecting emission of light from said scintillator elements at the ends of said fibres.

The detector of this invention may be used in conjunction with a radiation shield. The shield may be passive in a sense of being selected to reflect or absorb one or more preset types of radiation to provide a shielding effect, or it could be adapted to change its shielding spectrum according to the nature of the radiation that is detected by the radiation detector. Thus, for a structure that may be exposed to different types of radiation there may be a detector layer and a shielding layer. The detector layer may be connected to a processor which monitors the output from the detector to determine the particular radiation types, intensities etc incident upon the detector and then adaptively controls the shielding characteristics to selectively absorb or reflect one or more of the detected radiation types. The detector may determine a 2-D image of the incidence and intensities of any radiation types reaching the detector.

In one arrangement, there may be a detector layer made up of fibres containing or contacting said scintillator materials in a fibre composite lay up, and beneath the detector there may be a shielding layer made up of hollow fibres each containing or fillable with a radiation shielding material. The fibres may be connected to a suitable manifold or pump system that is operable to selectively introduce or withdraw different shielding materials to or from the hollow fibres, with the shielding material or materials being selected on the basis of the detected radiation. Thus, if such a structure is exposed to, say, neutron radiation, this is detected by the processor which will then control the manifold and pump arrangement to introduce into the hollow fibres a suitable neutron shielding material, either just in the fibres in the vicinity of the detected incidence or over the whole structure, depending on the particular application.

In this manner, an active or adaptive shield is provided in which the shielding material is actively selected and supplied to provide its shielding effect in direct response to the detected radiation. This means that the shield material can be selected according to the nature, and intensity of the incident radiation.

Thus in another aspect this invention provides a combination comprising a detector as described above in combination with a radiation shield means, wherein the detector is operable to monitor and/or control the effectiveness of the radiation shield means.

Preferably the shield means is adapted to allow the radiation shielding characteristics thereof to be adjusted and the combination preferably further includes a processor responsive to the output of said detector to control the radiation shielding characteristics of the shield to at least reduce the transmission of radiation therethrough.

The invention also extends to a radiation shield device comprising a plurality of hollow fibres filled with or fillable with one or more radiation shielding materials.

Whilst the invention has been described above it extends to any inventive combination of the features set out above or in the following description.

DESCRIPTION OF THE DRAWINGS

The invention may be performed in various ways and, by way of example only, an embodiment thereof will now be described with reference to the accompanying drawings, in which:—

FIG. 12 is a schematic view of an embodiment of active radiation shielding device in accordance with this invention.

DETAILED DESCRIPTION

Figure 1:
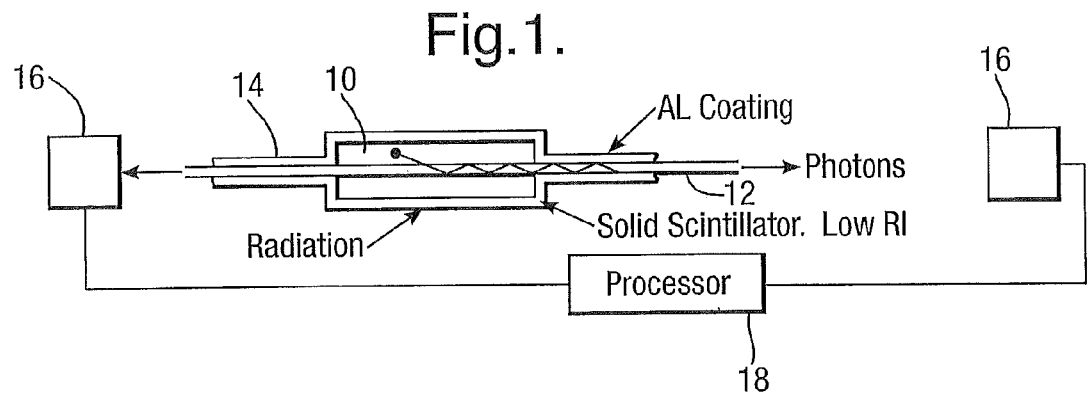
FIG. 1 is a schematic view of a first embodiment of radiation detector in accordance with this invention in which a fibre waveguide passes though a scintillator material.

Referring initially to FIG. 1 this shows a fibre sensor with a scintillator provided on the outside for detecting radioactive sources. In this embodiment, a solid scintillator 10 of low refractive index has a solid optical fibre 12 running through it in optically transmissive contact. The fibre and the scintillator have an external aluminium coating 14 to prevent the escape of light and also to prevent the admission of external light. The scintillator material is selected in accordance with the particular radiation to be detected so that it provides a detectable light emission when radiation of that type is incident. When the scintillator is bombarded by suitable radiation, it will emit light that enters the fibre and becomes trapped by total internal reflection. Light photons exit through both ends of the fibre. The fibre 12 may be glass or plastic, for example poly methyl methacrylate. The fibre 12 can be narrow or quite thick—of the order of a millimeter. The photons are electrically detected at each end of the fibre using a suitable detector 16 which may be an avalanche photodiode, an active pixel sensor, or a charge coupled device, some distance away out of the field of the radiation. The scintillator can be chosen to respond to alpha, beta (electron), x-ray, gamma, neutron or proton radiation.

The aluminium coating 14 behaves well at the UV end of the spectrum. Alternative materials include silver for longer wavelengths. The coating 14 may also carry a scratch resistant layer of plastic or a suitable paint for protection.

For neutron detection, the scintillator can be surrounded by a hydrogenous material, notably polythene or water to moderate or slow down high energy neutrons.

For detection, photons from either end of the fibre can be used; the time difference between the photons detected at each end on the detectors 16 may be determined using a processor 18 to thereby determine the location of the incident radiation.

The sensor may be quite short with a single block of solid scintillator, or it may be very long with scintillator blocks spaced along the length, or the entire fibre length encased in scintillator material. In another arrangement, not shown, the sensor may comprise multiple fibres in a parallel bundle for redundancy and efficiency of detection.

Figure 2:
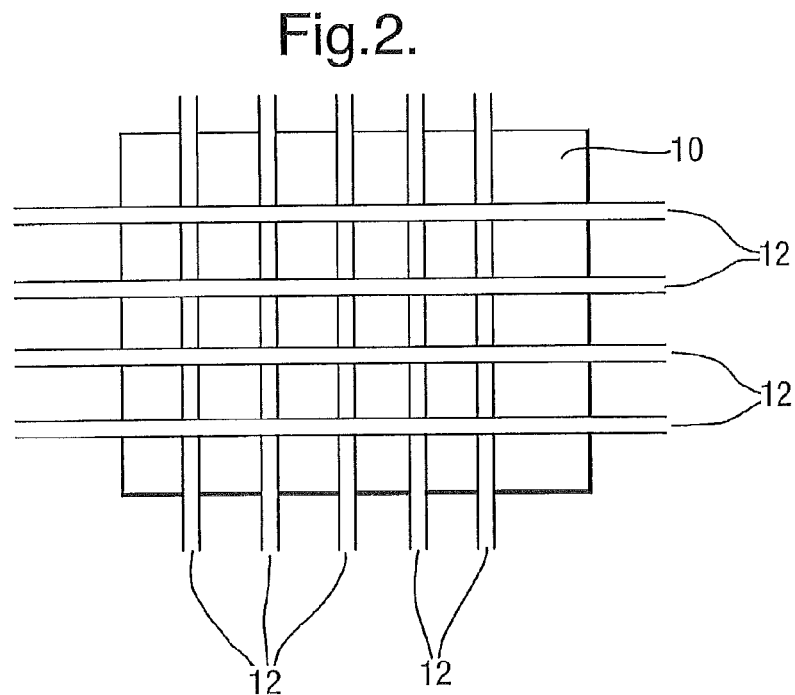
FIG. 2 is a schematic view of a two-dimensional radiation detector in accordance with this invention.

Referring now to FIG. 2, the fibres 12 can be mounted in the scintillator 10 in an x-y plane with the fibres running in orthogonal rows and columns and respective detectors (not shown) at each end. In this way, detection can be provided over an extended area. Likewise, a cube may be made up of successive stacked x-y planes or it may be made up of orthogonally arranged x,y,z direction fibres. The 2-D array or the 3-D structure can be embedded in a common scintillator.

A graded scintillator profile may be arranged by stacking successive x-y planes in which the scintillator material is different between planes, for detecting different types of radiation at different planes. For example an arrangement could be made to detect beta particles at an outer layer, gamma radiation towards the middle and neutrons towards the centre. Likewise layered structures may be built for the detection of thermal, epithermal, and fast neutrons.

Figure 3:
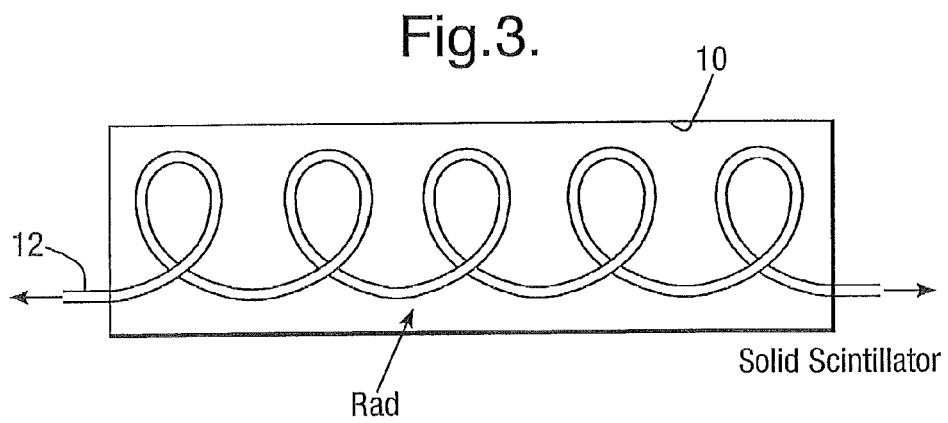
FIG. 3 is a schematic view of a helical arrangement.

Referring to FIG. 3, to increase photon capture the fibre may follow a helical or serpentine path through the scintillator material 10. Due to the losses associated with tight bending radii the number of turns within the scintillator material should be limited.

Figure 4:
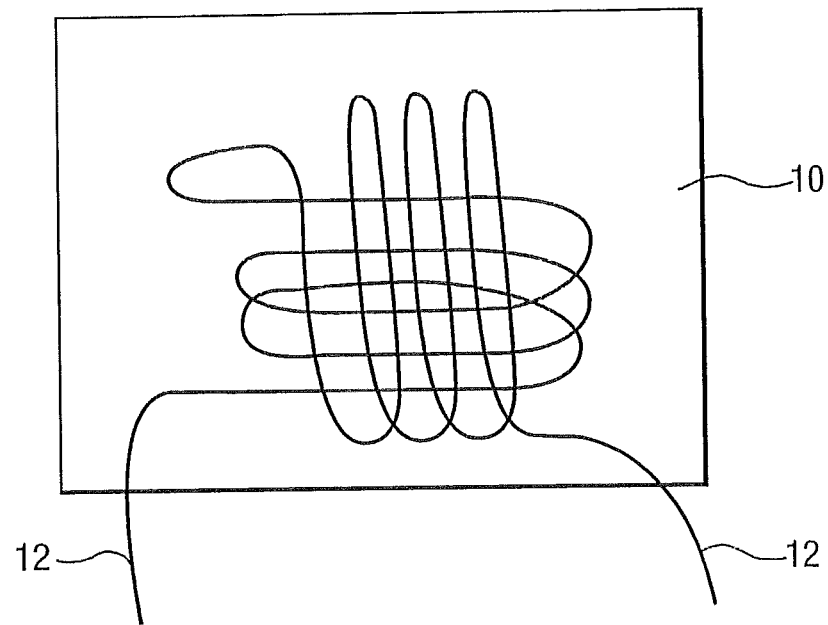
FIG. 4 is a schematic view of a woven arrangement
Figure 5:
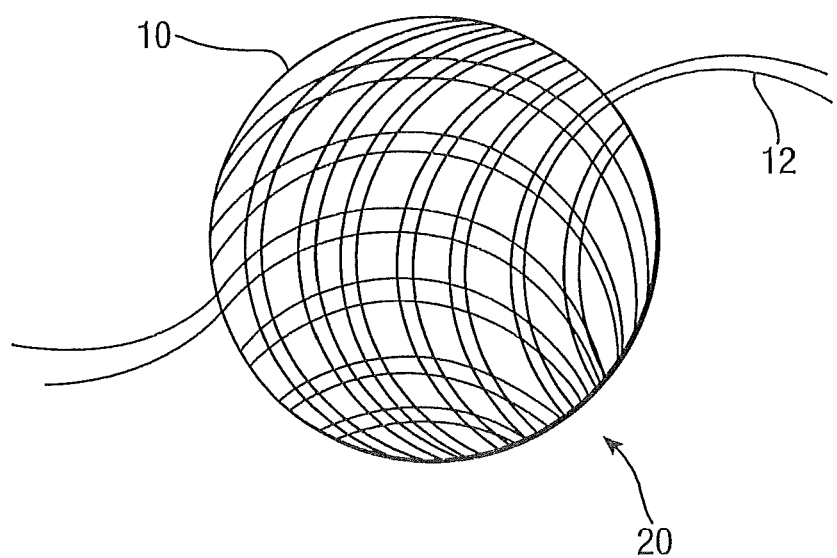
FIG. 5 is a schematic view of a spherical arrangement.

Referring to FIG. 4, the fibre may traverse the scintillator material 10 in a woven pattern. FIG. 5 shows another embodiment where the fibre 12 is wrapped to make a fibre ball 20 around and contained in the scintillator 10.

Figure 6A:
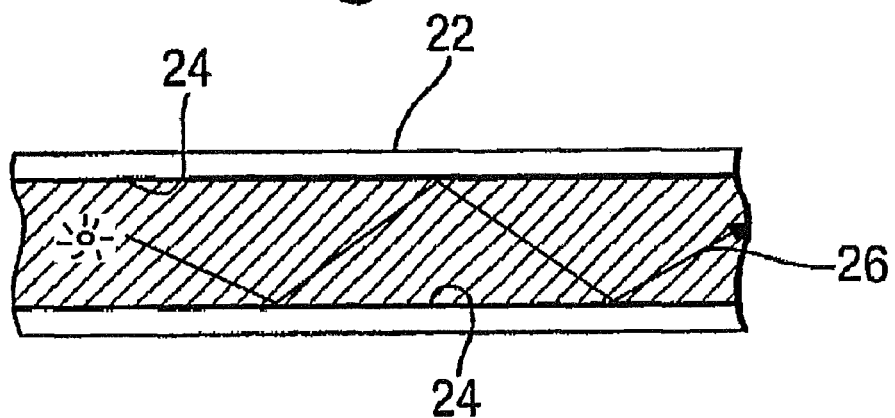
FIGS. 6(a) and 6(b) are respective schematic views of alternative embodiments of radiation detector in accordance with this invention in which the scintillator material is contained within a hollow fibre.
Figure 6B:
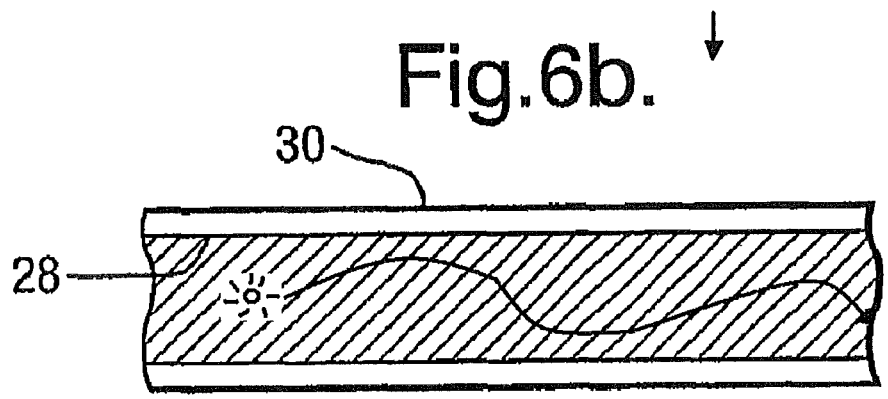
Figure 6C:
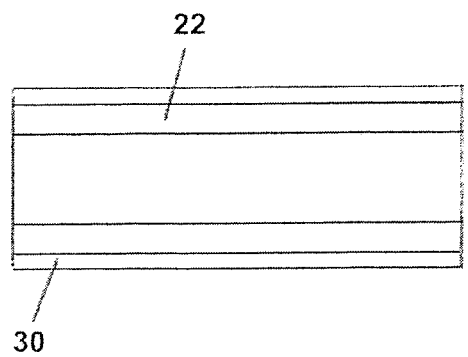
FIG. 6c is a schematic view of the light emissions transmitted to said detector through a fibre wall by total internal reflection in accordance with an exemplary embodiment.

In the arrangements of FIG. 6, the fibre sensor is provided with a scintillator material on the inside. There are two versions of this arrangement; in FIG. 6(*a*) there is a hollow fibre 22 that is mirrored on the inside with an aluminium coating 24 and the remainder of the internal space filled with either a liquid, a gel or solid scintillator 26. In this arrangement, incidence of the appropriate radiation on the scintillator material causes generation of a photon 25 which is caused to traverse to the end of the fibre through total internal reflection of the coating on the inner wall of the fibre. In this embodiment the hollow fibre 22 acts purely as a structural tube and not as a light guide.

Referring now to FIG. 6(*b*) in this arrangement an optical fibre 28 is provided with an external mirror coating 30 of aluminium or a suitable optical cladding of refractive index less than that of the fibre to support total internal reflection. The scintillator gel 32 or liquid of a similar refractive index to that of the fibre wall is contained within the fibre 28. Again, in FIGS. 6(*a*) and (*b*) incidence of radiation of the appropriate type causes scintillation and the photons are passed to the detectors (not shown) at the end of the fibre by total internal reflection.

Figure 7:
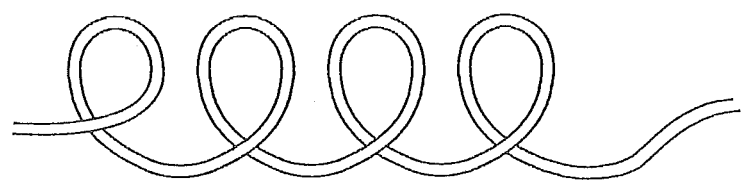
FIG. 7 is a schematic view of a helical arrangement.
Figure 8:
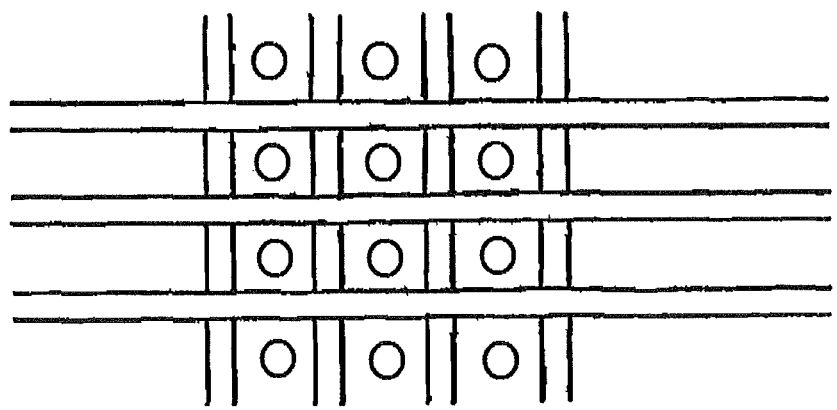
FIG. 8 is a schematic view of an orthogonal X,Y,Z arrangement.

As with the embodiment of FIG. 1, the fibres may be mounted in an x-y plane similar to FIG. 2 or in a helical structure (FIG. 7) or in a 3-D cube (FIG. 8). Similarly a fibre ball can be provided. Of course in these latter arrangements, the scintillator material is contained within the tube and so no external scintillator material is required.

Figure 9:
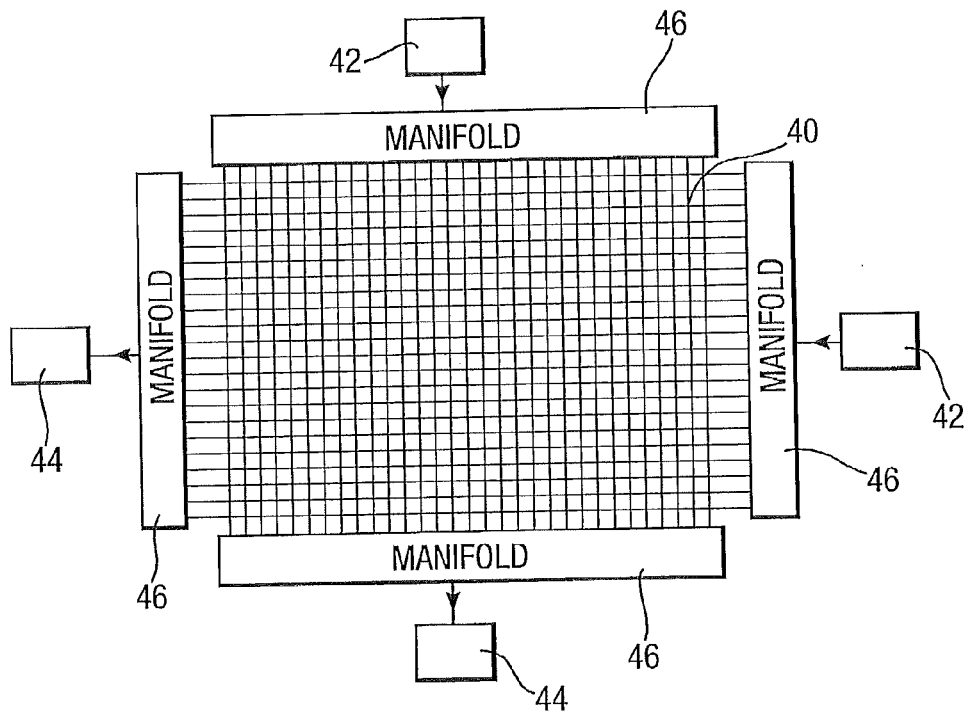
FIG. 9 is a schematic view of a two-dimensional arrangement which allows a liquid or gel scintillator material to be removed or replaced in the hollow fibres.

Referring to FIG. 9, in this arrangement optical fibres containing scintillator material are arranged in an x-y plane and connected to respective supplier and return chambers 42,44 by means of respective inlet and outlet manifolds 46. In this arrangement, the scintillator material within the fibres may be removed or exchanged for a different material. The array of FIG. 9 may be tuned to allow it to detect radiation of different form by pumping out the existing scintillator material and replacing it with a different scintillator material. The manifolds will also contain the photon detectors at the end of each fibre. The array may also have one or more reservoirs of selected liquid or gel shielding materials that can be pumped into the fibres after removal of the scintillator material, to effect shielding of the structure.

Figure 10:
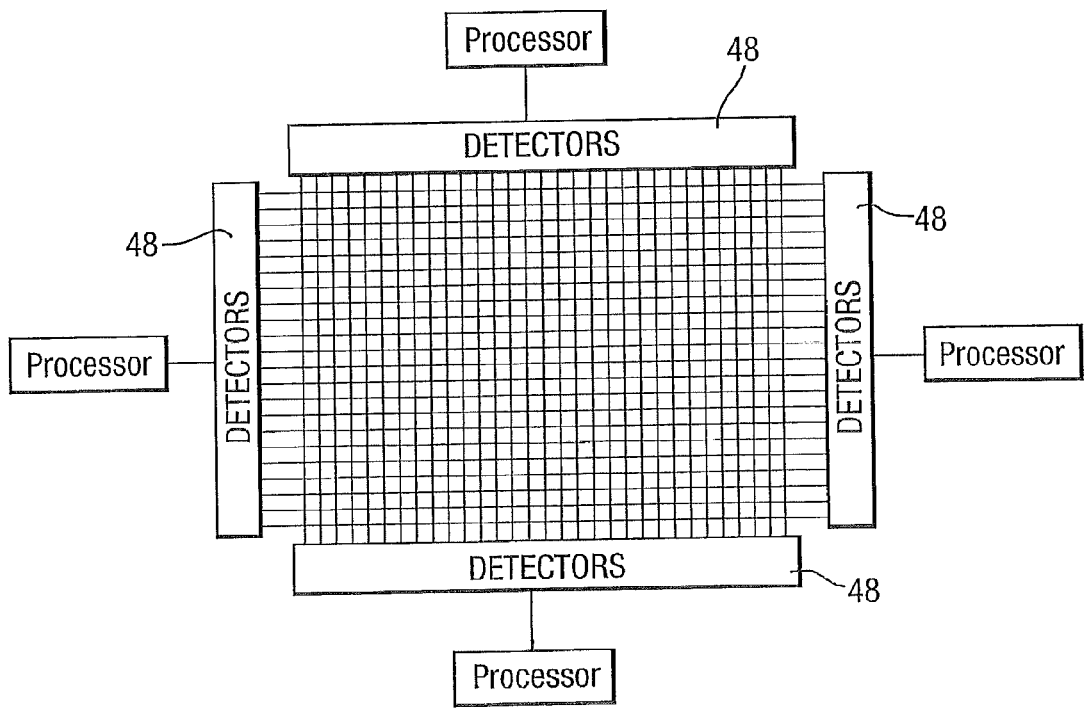
FIG. 10 is a schematic view of a two-dimensional arrangement in which the location of the incidence of the array may be detected.

Referring now to FIG. 10, in this arrangement the arrival times of the photons at the ends of each fibre 40 is detected by respective detectors in arrays 48, thereby to determine the exact location of the radiation event that caused the emission of the photon. It will be appreciated that this enables the x-y coordinates of a radiation source to be detected by the processors. This arrangement is particularly useful in detecting leakage of radiation or radiation hotspots.

Figure 11:
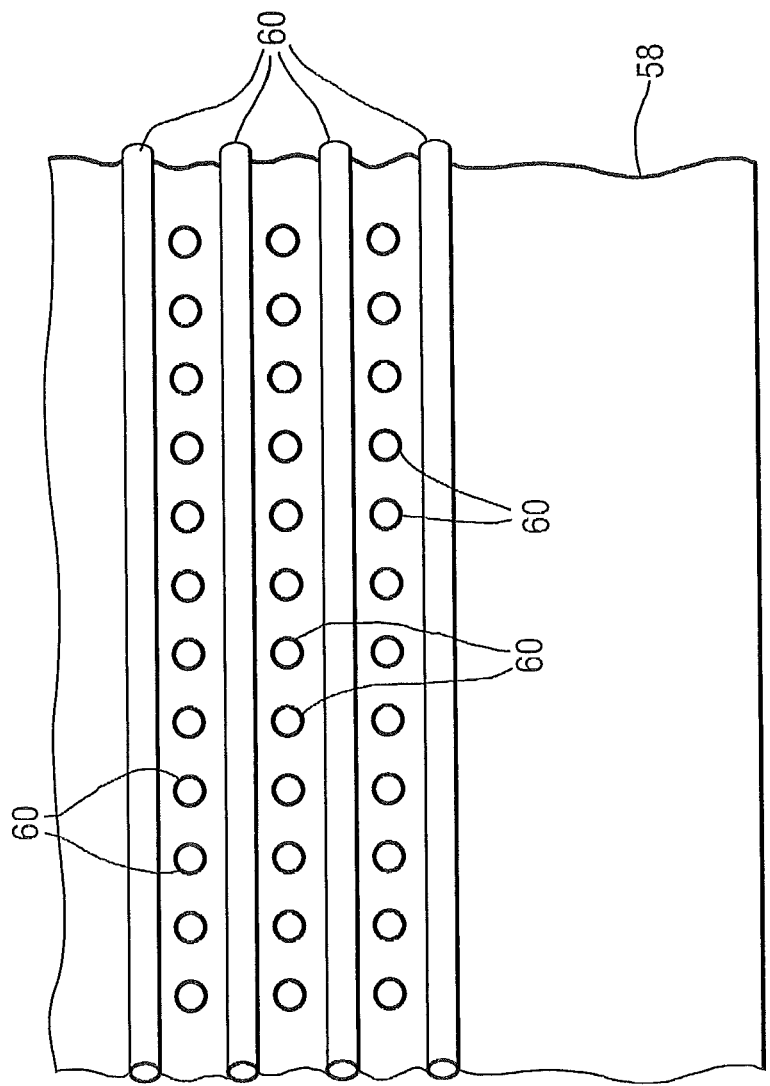
FIG. 11 is a section view through a fibre composite structure in accordance with this invention comprising orthogonally arranged layers of fibres.

Referring now to FIG. 11, and the detectors described above are intended to be incorporated into other materials. In FIG. 11 a conventional composite fibre lay-up 58 is overlaid by detector fibres 60 filled with scintillator material and arranged in x-y fashion. This provides detection integrated in the existing composite structure.

Other modifications include the construction of special layered structures. For example in one such structure the innermost layer would typically be used to detect thermal neutrons. The layer would be made up of fibres containing a scintillator material and surrounded by polythene. The polythene moderator could be replaced or supplemented by the use of auxiliary fibres carrying a liquid moderator. Middle layers of the structure would typically be used with the detection of epithermal neutrons, high energy neutrons and gamma protons. For the detection of epithermal neutrons, a fibre with an internal mirror coating of silver, platinum, gold or possibly indium are advantageous because these elements resonate at the epithermal energies and will greatly improve the detection efficiency. These metals emit gamma photons which are readily detected by a liquid scintillator. The outer layer may be used for the detection of alpha and, if required, beta particles (electrons). The order of the layers may be adjusted and the scintillator in a given layer may be dual purpose, also acting as a moderator.

Mixed or multiple scintillators can be used and fibres for different layers can be linked in series or brought out separately. The array may embody redundant fibre for test purposes or reasons of reliability. Additional fibres may be placed around the detector to maintain a given temperature by allowing pumping of coolant or heating fluid through them. Additional hollow fibres may also be placed around the detector to provide thermal insulation and protection.

In one arrangement, the detector is made up as a flexible mat; such a mat may be used in non-destructive testing in a manner similar to a flexible photographic plate. Thus the mat could be laid over the structure to be tested and the structure then exposed to a flash of x-rays from the side opposite the mat, with the position of holes or cracks being evident from the locations of radiation detected on the mat.

It is also possible to weave the material into clothing for example to monitor or detect exposure to radiation. The clothing could be in the form of the bodysuit, gloves, etc.

The detector may also be encased in a suitable matrix material such as concrete or other structural or shielding material so as to detect or monitor the condition of an enclosed object. For example, to monitor a nuclear reactor in a power station, the reactor could be housed within a building structure in which the fibre detectors are embedded in the walls of the building. Alternatively the detector may be embedded in the external surface of a building or vehicle or vessel at risk from exposure to radiation.

In its elongate fibre form the detector can also provide monitoring along the length of an elongate structure such as the interior of a submarine hull, or alongside a road or down a mineshaft, and provide information on the location of any radiation incident thereon.

The detectors can also be used in conjunction with active or passive shielding devices to monitor the effectiveness of the shielding and to detect the nature of the radiation to allow the shielding to be correspondingly adjusted.

Referring now to FIG. 12, in this arrangement a composite structure is made up of a plastics material matrix (not shown) in which are distributed hollow fibres 100 e.g. of glass. The fibres are arranged into layers, an outer detector layer 102 and an inner shielding layer 104. Each layer has a respective manifold and pump system 106, 108, which allows preset material in liquid, or gel form to be introduced into the hollow fibres 100 from respective reservoirs 110, 112. The construction of the detector layer is similar to that of previous embodiments and allows respective scintillation materials to be introduced into and withdrawn from the fibres or groups thereof so that they act as detectors of the respective radiation.

The manifolds 106, 108 are designed to allow different materials to be selectively introduced into and withdrawn from the hollow fibres. The scintillation manifold 106 also includes detectors (not shown but similar to detectors in arrays 48 in FIG. 10) for detecting scintillation occurring in the detector layer 102 due to the incidence of radiation of the relevant type. The detectors are preferably operable to detect the position of the incidence of radiation so that a two-dimensional map of incidence and radiation type may be determined. A processor 114 receives the outputs from the detectors associated with the manifold 106 and controls the manifold and pumps of the detector manifold to tune or render the detection layer or selected regions or sub-layers thereof sensitive to different radiation types. The processor also controls the manifold and pump system 108 for the shield materials. The processor 112 is programmed to detect incidence of radiation of the various types and then to cause a shield material (or combination thereof) optimised for shielding of the radiation of that type or types to be introduced into the hollow fibres, at least in the area of incidence of that radiation.

The invention also extends to an active shield arrangement per se, comprising a fibre arrangement of hollow fibres and means reintroducing selectively into said fibres a predetermined shielding material or materials.

The invention claimed is:

1. A detector for detecting ionising radiation, comprising:
a scintillator selected to emit light in response to incident radiation;
at least one detector for detecting the emitted light;
a plurality of optical waveguides, the plurality of optical waveguides disposed orthogonally in rows and columns and for transmitting the emitted light to the detector, wherein each of the plurality of optical waveguides comprises a hollow optical fibre containing a replaceable scintillator material in the hollow of the optical fibre,
at least one manifold configured to selectively introduce and withdraw different scintillator materials from the plurality of optical waveguides to adapt the detector for detecting radiation of different types; and
a processor configured to receive output from the at least one detector and control the introduction and withdrawal of the different scintillator materials from the plurality of optical waveguides based on different types of radiation.

2. The detector according to claim 1, wherein the reflective material is selected from the group consisting of gold, silver, platinum, indium and aluminum.

3. The detector according to claim 1, wherein the plurality of optical fibres are disposed orthogonally in three dimensions (X,Y,Z).

4. The detector according to claim 1, wherein the at least one detector comprises:
means for detecting light emissions at opposite ends of the waveguide.

5. The detector according to claim 1, wherein the scintillator material is responsive to at least one of alpha particles, beta particles (electrons), x-ray radiation, gamma radiation, neutrons, protons.

6. The detector according to claim 1, wherein each of the plurality of optical waveguides is responsive to a selected radiation.

7. The detector according to claim 1, wherein the plurality of optical waveguides are arranged in layers, with each layer being responsive to a predetermined radiation.

8. The detector according to claim 1, wherein the scintillator material comprises a liquid.

9. The detector according to claim 1, wherein the scintillator material comprises a gel.

10. The detector according to claim 1, wherein the detector is a flexible mat.

11. The detector according to claim 1, wherein each of the plurality of optical waveguides is a flexible optical fibre.

* * * * *

UNITED STATES PATENT AND TRADEMARK OFFICE
CERTIFICATE OF CORRECTION

| | | |
|---|---|---|
| PATENT NO. | : 9,040,928 B2 | |
| APPLICATION NO. | : 13/298025 | |
| DATED | : May 26, 2015 | |
| INVENTOR(S) | : Michael Dunleavy et al. | |

It is certified that error appears in the above-identified patent and that said Letters Patent is hereby corrected as shown below:

On the title page, Column 1, item (75) Inventors. The inventor's name, Nicholas Robert Giacomo Colosimo should read: Nicholas Giacomo Robert Colosimo Signed and Sealed this
Sixth Day of October, 2015

Michelle K. Lee
*Director of the United States Patent and Trademark Office*